United States Patent [19]

Scales

[11] 4,012,238
[45] Mar. 15, 1977

[54] METHOD OF FINISHING A STEEL ARTICLE HAVING A BORONIZED AND CARBURIZED CASE

[75] Inventor: Stanley R. Scales, Houston, Tex.

[73] Assignee: Hughes Tool Company, Houston, Tex.

[22] Filed: Sept. 25, 1975

[21] Appl. No.: 616,537

Related U.S. Application Data

[63] Continuation-in-part of Ser. No. 387,566, Aug. 10, 1973, Pat. No. 3,922,038.

[52] U.S. Cl. .................................. 148/6; 148/6.3; 148/31.5; 148/16.5; 308/8.2; 175/374
[51] Int. Cl.² ..................... C23C 9/08; C23C 9/00
[58] Field of Search ............ 148/6, 16.5, 31.5

[56] References Cited

UNITED STATES PATENTS

| | | | |
|---|---|---|---|
| 3,275,389 | 9/1966 | Neilson et al. | 308/8.2 |
| 3,811,961 | 5/1974 | Weinstein et al. | 148/31.5 |
| 3,824,134 | 7/1974 | Chance | 148/16.5 |
| 3,842,921 | 10/1974 | Dill et al. | 148/16.5 |
| 3,922,038 | 11/1975 | Scales | 148/16.5 |

Primary Examiner—Ralph S. Kendall
Attorney, Agent, or Firm—Robert A. Felsman

[57] ABSTRACT

Disclosed herein is an improved method of finishing a steel article having a carburized and boronized case. The article is carburized to a selected depth then finished to a smoothness which is smoother than the desired final finish. The article is then boronized, hardened and tempered. Further finishing is unnecessary.

7 Claims, 2 Drawing Figures

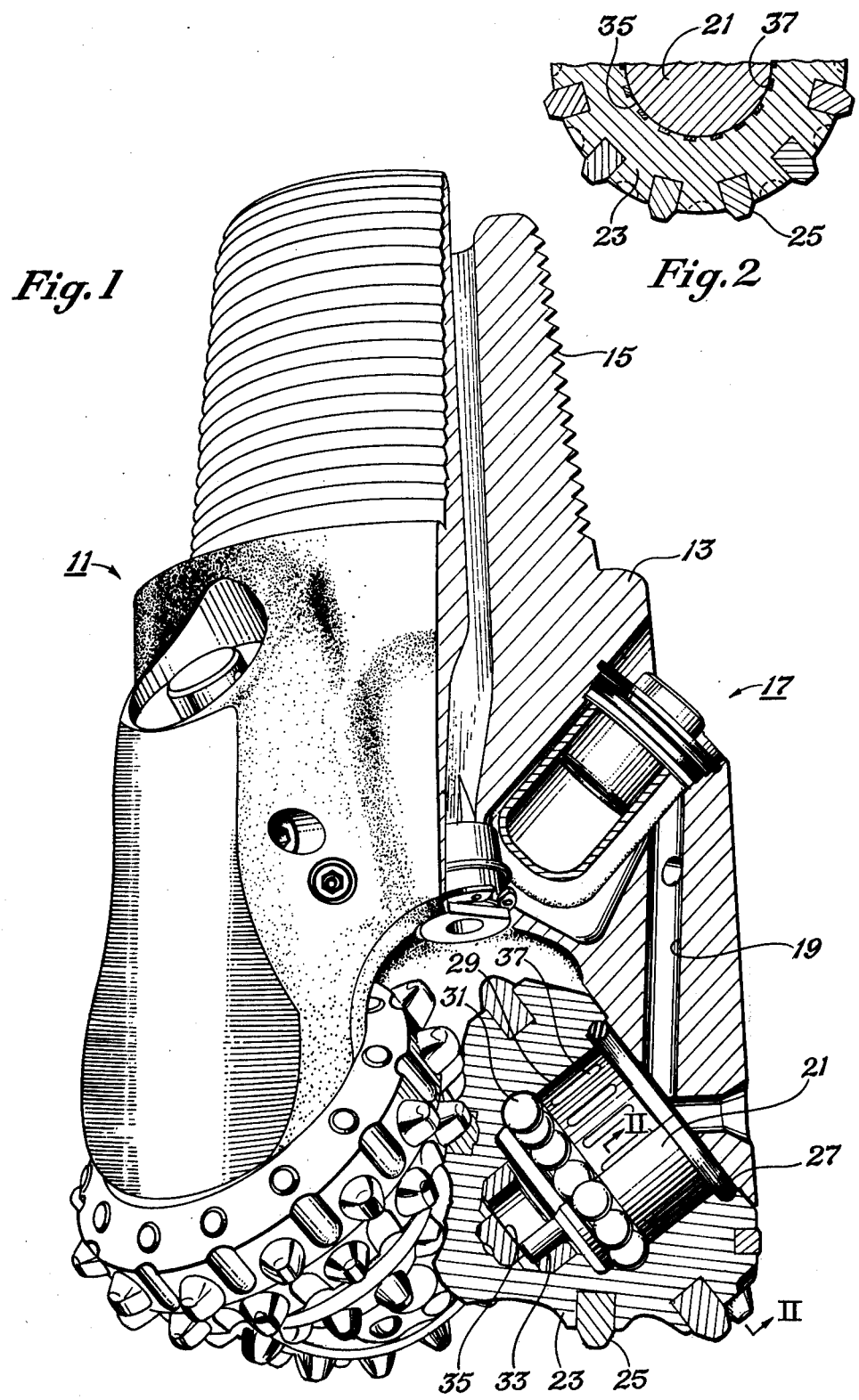

2

METHOD OF FINISHING A STEEL ARTICLE HAVING A BORONIZED AND CARBURIZED CASE

CROSS REFERENCE TO RELATED APPLICATIONS

This application is a continuation-in-part of my co-pending application, "Wear Resistant Boronized Surfaces and Boronizing Methods", Ser. No. 387,566, filed Aug. 10, 1973; now U.S. Pat. No. 3,922,038.

BACKGROUND OF THE INVENTION

1. Field of the Invention

This invention relates in general to surface treatment of metals, particularly to those for steel requiring exceptional wear resistance under heavy loads such as those imposed upon earth boring drill bit bearings.

2. Description of the Prior Art

In my copending application, Ser. No. 387,566, I describe a method of providing a strong and tough wear resistant surface for steel articles. This method involves carburizing a machined part, boronizing over the carburized case, then hardening from a protective atmosphere and tempering. This method is particularly suitable for the bearing surfaces of earth boring bits, which are under very heavy loads.

It is known that the initial seizure point of a bearing depends to a large extent on the smoothness of the bearing surface. In view of the large loads applied to the bearings of earth boring bits, a relatively smooth surface finish is required.

Because of the extreme hardness of a boronized case, it is difficult to obtain a smooth surface. One prior art method is to use a lapping technique with diamond paste or abrasive. This is expensive and difficult. Polishing the "green" stock or metal before carburizing does not solve the problem because the carburizing and boronizing processes roughen the surface. In the prior art, polishing green stock prior to carburizing to the smoothest finish practical results in a surface finish of about 45–80 microinch RMS (root mean square) after boronizing.

SUMMARY OF THE INVENTION

This invention relates to the discovery that polishing the surface of a steel member such as a bearing after carburizing but before boronizing provides a suitable final finish without the need for further finishing. This improved method includes the step of carburizing, finishing, boronizing, hardening from a protective atmosphere and tempering the steel bearing member. Using this technique, the finish on the green stock does not need a high degree of smoothness. In order to achieve the desired 45 microinch RMS or better final finish, a 32 microinch RMS finish or better is produced on the carburized surface before boronizing. Finishing the carburized surface before boronizing is much easier than finishing the harder boronized surface and can be performed by several methods.

BRIEF DESCRIPTION OF THE DRAWINGS

FIG. 1 is a fragmentary perspective view, partially in section, showing an earth boring bit and typical bearing which receives the treatment described herein.

FIG. 2 is a cross-sectional view as seen looking along the lines II-II of FIG. 1.

DESCRIPTION OF THE PREFERRED EMBODIMENT

The numeral 11 in the drawing designates an earth boring drill bit having a plurality of head sections or legs 13 joined by suitable means such as welding (not shown) and threaded at 15 for attachment to a supportive drill string member. One of the prior art lubrication and compensator systems 17, such as illustrated in FIG. 1, feeds lubricant through a passageway 19 and into a bearing region formed between a cantilevered shaft or pin 21 of the head section and a rotatable cutter 23 having teeth 25 for disintegrating earth. Suitable seal means 27 prevent the escape of lubricant from the bearing region, as explained in U.S. Pat. No. 3,397,928.

The above mentioned bearings in an earth boring drill often include a primary friction region 29, an anti-friction ball bearing and cutter retainer region 31, and radial and thrust friction bearing regions designated respectively 33 and 35.

FIG. 2 shows in cross-section the cantilevered bearing pin 21 and rotatable cutter 23. The cylindrical surface 35 of the bearing pin 21 receives the special treatment of the present invention, while the opposing surface of the rotatable cutter 23 receives a prior art treatment such as that described in U.S. Pat. No. 3,235,316, preferably that using silver alloy. This patent teaches that improved friction bearings for earth boring drill bits result from the use of indentations filled with soft anti-galling material such as silver, copper or silver alloy 37 in a surface having a hardness and wear resistance comparable to carburized and hardened steel.

As previously stated, this invention utilizes five primary method or process steps: carburizing, finishing, boronizing, hardening and tempering, each of which will be described separately by way of example. The initial step in the method of this invention requires carburization of a steel bearing surface such as the primary friction bearing region 29. One of the prior art carburization methods may be used. Gas carburizing is a well known art and is the preferred method. It is described on pp. 93–114 of Volume 2 of the 8th Edition of the Metals Handbook, "Heat Treating, Cleaning and Finishing" (1964, American Society for Metals). An example of the gas carburizing of the bearing surfaces of a selectively copper plated rock bit head section made of A.I.S.I. 4815 steel is as follows:

Carburizing temperature: 1700° F.
Carburizing time: Nine hours at 1700° F.
Carburizing atmosphere: Generated endothermic gas enriched with methane to have a carbon potential of 1.35% carbon.

A typical analysis of the carburizing gas (atmosphere) is as follows:
40% $N_2$
20% CO ($CO_2$ about 0.05%)
38% $H_2$
2% $CH_4$ This produces a carburized case depth of about 0.065 inch with carbon content at the surface about 1.00%.

Pack carburizing is another well known art that may be used. It is described on pp. 114–118 of Volume 2 of the same Metals Handbook. An example of pack carburizing of the bearing surfaces of a rock bit head section made of A.I.S.I. 4815 steel is as follows:

Carburizing compound (packed around the surface to be carburized): Charcoal, 90% (6 to 14 mesh size), energized with about 4% BaCO₃ and about 1.5% CaCO₃.

Carburizing temperature: 1700° F.

Carburizing time: Nine hours at 1700° F.

This produces a carburized case depth of about 0.065 inch with carbon content at the surface about 1.00%.

Liquid carburizing is another well known art to the metals industry. It is described on pp. 133–145 of Volume 2 of the same Metals Handbook. While not actually used for this invention, it is anticipated that nine hours at 1700° F. in a salt bath containing about 6–16% sodium cyanide and 30–55% barium chloride would produce a satisfactory carburized case to a depth of about 0.065 inch.

The second step of the method of this invention is finishing the carburized surface. This may be performed by any of several finishing techniques, such as grinding, honing or lapping. In the preferred method, grinding has been found suitable. The carburized surface should be finished to 32 microinch RMS or better. This results in a final finish after boronizing and hardening of 45 microinch RMS or better.

The third step of the method of this invention is boronizing of the previously carburized surfaces. Pack boronizing is the preferred technique and is a relatively new art.

An example of boronizing a carburized bearing surface of an A.I.S.I. 4815 steel head section is as follows:

Compound: Boronizing powder was packed around the carburized bearing surface. This powder was 90% finer than 150 mesh, had 40–80% B₄C, 2–40% C (graphite), 1–4% KHCO₃, with remainder up to 20% in impurities.

Boronizing temperature: 1650° F. (in a carburizing atmosphere).

Boronizing time: 5 hours at temperature in a furnace with a carbon potential of 1.00%.

This produced a boronized case depth of about 0.004 inch. Longer boronizing times and/or higher boronizing temperatures can be used for deeper boronized case depth, but a 0.001 to 0.005 inch deep boronized case better retains a satisfactory surface finish.

Gas boronizing is an alternate technique in the prior art. It is described in U.S. Pat. No. 2,494,267, "Surface Hardening of Ferrous Metals", Schlesinger and Schaffer, Jan. 10, 1950. The method described utilizes gaseous diborane (B₂H₆) at about 700° C (1292° F.).

Liquid boronizing is another prior art boronizing method. It is described in two papers: "Boronizing of Steel" by D. C. Durrill and Dr. Donald D. Allen, Magnetic Propulsion Systems, Inc. and "Boriding Steels for Wear Resistance" by Howard C. Fielder and Richard J. Sieraski, General Electric Co. (*Metal Progress*, Feb. 1971, pp. 101–107). Neither gives the liquid salt bath composition, but the latter paper states that it contains fluorides of lithium, sodium, potassium and boron. Temperatures and times reported vary from 1450° F.–1650° F. and from 15 minutes to 36 hours.

The third and fourth steps in the method of this invention are hardening and tempering of the carburized, finished, boronized and cleaned steel surfaces.

The hardening and tempering of carburized steel is a well known art. The hardening, usually quenching in agitated oil, from a temperature of at least 1390° F. can be performed using one of several procedures, such as the following two for carburized A.I.S.I. 4815 steel, and produces a martensitic case:

a. Single quench from a carburizing or reducing atmosphere and a temperature of 1500° F.

b. Double quench from a carburizing or reducing atmosphere and temperatures of respectively 1550° F. and 1435° F.

Quenching from a protective (carburizing or reducing) atmosphere prevents decarburization or oxidation of the boronized case. Or a suitable coating such as copper plating may be used. A suitable atmosphere is one similar to the previously disclosed methane enriched endothermic gas except slightly higher in CO₂ (about 0.4 to 0.8%) because of the lower temperatures.

The tempering temperature is usually low, 290° F.–510° F., preferably about 330° F. for 1 hour, to toughen the carburized case without appreciably lowering its strength (hardness) to produce tempered martensite.

The above described procedures are utilized to produce a carburized foundation on the steel bearing pin 21 of at least 0.060 inch. The boronizing procedure produces a boronized case of at least 0.001 inch (average about 0.004 inch) with a surface hardness in a range of 900 to 2100 KHN. The hardening and tempering procedure develops a hardness in the carburized foundation in a range of 50 to 64 Rockwell "C" (550 to 800 KHN). Surface finish is 45 microinch RMS or better. When such a bearing pin is assembled with a rotatable cutter of the type shown in the drawing and described in U.S. Pat. No. 3,235,316, overall bearing performance is much improved over that obtainable with a carburized bearing surface. Results indicate that such a surface performs comparably with much more expensive procedures such as when utilizing a deposit of hard metal of the cobalt based "Stellite" series in a groove on the bearing pin.

Bearing machine tests were conducted with shafts finished after carburizing in accordance with this invention. Shafts under processing wherein no finishing was performed after carburizing were also tested similarly. These shafts had a final finish from 45–80 microinch RMS. Various bushings were utilized, some of them having indentations filled with silver alloy as described in U.S. Pat. No. 3,235,316.

The shafts were rotated at a constant speed with loads steadily increasing. Loads at which initial seizures began were noted. Although the initial seizures do not completely lock the shaft to the bushing, additional friction and heat occur at this condition. The initial seizure in terms of pressure velocity, or pounds per square inch times feet per minute, was approximately three times higher for shafts treated in accordance with this invention than for shafts treated in accordance with the invention disclosed in my parent application.

It can readily be seen that a method having significant advantages has been provided. A desired final smoothness may be achieved by polishing or finishing the shafts after carburizing and before boronizing. The carburized surface is softer and much easier to finish than the boronized surface. Boronizing slightly roughens the polished carburized surface, but the final surface is still within the satisfactory range.

While the invention has been described in only a few of its forms, it should be apparent to those skilled in the art that it is not so limited but is susceptible to various changes and modifications without departing from the spirit thereof.

I claim:

1. The method of manufacturing steel friction bearing members requiring a strong and tough wear resistant surface, said method comprising the steps of:
   carburizing said surface to produce a carburized case of selected depth;
   applying a finish to the carburized surface smoother than the desired final smoothness;
   boronizing the carburized case;
   hardening the carburized case; and
   tempering the carburized case.

2. The method defined by claim 1 wherein the applied finish to the carburized surface is 32 microinch RMS or better.

3. The method defined by claim 1 wherein said carburizing is to a depth of at least 0.030 inch and said boronizing is to a depth of at least 0.001 inch.

4. The method defined by claim 1 wherein said hardening is by quenching from a protective atmosphere.

5. The method of manufacturing steel friction bearing members requiring a strong and tough wear resistant surface, said method comprising the steps of:
   carburizing said surface to a case depth of at least 0.030 inch;
   finishing said carburized surface to 32 microinch RMS or better; then
   boronizing the finished carburized surface to a depth of at least 0.001 inch;
   quenching said carburized case from temperature to produce a martensitic grain structure;
   tempering said carburized case to produce a tempered martensitic grain structure;
   whereby the wear resistant boronized surface has a tough and strong supporting base to sustain large loads and avoid brittle fracture and a smooth final finish requiring no further finishing.

6. The method of manufacturing steel friction bearing members requiring a strong and tough wear resistant surface, said method comprising the steps of:
   carburizing said surface to a case depth of at least 0.030 inch;
   finishing said carburized surface to a finish of 32 microinches RMS or better;
   boronizing the finished carburized surface to a depth of at least 0.001 inch;
   quenching said carburized case from a temperature of at least 1390° F. to produce a martensitic grain structure; and
   tempering said carburized case from a temperature within a range of 290° through 510° for about one hour to produce a tempered martensitic grain structure.

7. The method defined by claim 6 wherein the final surface finish of the carburized and boronized surface is 45 microinches RMS or better without additional finishing after tempering.

* * * * *

UNITED STATES PATENT OFFICE
CERTIFICATE OF CORRECTION

Patent No. 4,012,238      Dated March 15, 1977

Inventor(s) Stanley R. Scales

It is certified that error appears in the above-identified patent and that said Letters Patent are hereby corrected as shown below:

Column 4, line 45, "shafts" is changed to read ---bushings---.

Signed and Sealed this twenty-third Day of August 1977

[SEAL]

Attest:

RUTH C. MASON
*Attesting Officer*

C. MARSHALL DANN
*Commissioner of Patents and Trademarks*